United States Patent
Wu et al.

(10) Patent No.: US 7,598,023 B2
(45) Date of Patent: Oct. 6, 2009

(54) PROCESS FOR FABRICATING MICRO-DISPLAY

(75) Inventors: Yi-Tyng Wu, Chiayi (TW); Shih-Hung Chen, Hsinchu (TW); Huai-Hsuan Tsai, Tainan (TW); Chih-Hung Cheng, Hsinchu County (TW); Chien-Hua Tsai, Taichung (TW); Hsuan-Hsu Chen, Hsinchu County (TW)

(73) Assignee: United Microelectronics Corp., Hsinchu (TW)

( * ) Notice: Subject to any disclaimer, the term of this patent is extended or adjusted under 35 U.S.C. 154(b) by 579 days.

(21) Appl. No.: 11/162,909

(22) Filed: Sep. 28, 2005

(65) Prior Publication Data

US 2007/0072130 A1    Mar. 29, 2007

(51) Int. Cl.
*G03F 7/00*    (2006.01)
(52) U.S. Cl. .................. 430/313; 430/311; 430/314; 430/950
(58) Field of Classification Search ........... None
See application file for complete search history.

(56) References Cited

U.S. PATENT DOCUMENTS

| 6,620,715 | B1 * | 9/2003 | Blosse et al. ............ 438/585 |
| 2003/0040174 | A1 * | 2/2003 | Tan et al. ............ 438/638 |

* cited by examiner

*Primary Examiner*—John A McPherson
*Assistant Examiner*—Daborah Chacko Davis
(74) *Attorney, Agent, or Firm*—Jianq Chyun IP Office

(57) ABSTRACT

A process for fabricating a micro-display is provided. First, a wafer having a driving circuit thereon is provided. Then, a metallic reflective layer is formed on the wafer. Thereafter, an anti-reflection layer and a patterned photoresist layer are sequentially formed on the metallic reflective layer. Using the patterned photoresist layer as an etching mask, the anti-reflection layer and the metallic reflective layer are etched to form a trench pattern that exposes the surface of the wafer. After that, the patterned photoresist layer is removed. A dielectric layer is formed to cover the anti-reflection layer and fill the trench pattern. Then, a portion of the dielectric layer and the anti-reflection layer are removed to expose the surface of the metallic reflective layer.

21 Claims, 5 Drawing Sheets

PROCESS FOR FABRICATING MICRO-DISPLAY

BACKGROUND OF THE INVENTION

1. Field of the Invention

The present invention generally relates to a process for fabricating a micro-display. More particularly, the present invention relates to a process for fabricating a micro-display with a larger micro-display aperture ratio.

2. Description of the Related Art

In recent years, liquid crystal pixel structures have been widely used in many types of liquid displays and liquid crystal projectors including such family products as the liquid crystal televisions, hand-held computers or desktop computers. In particular, liquid crystal projectors have become one of the indispensable tools for displaying something large. At the core of a liquid crystal projector is an optical engine. The optical engine mainly comprises a light source, optical elements built from sets of prisms and a number of liquid crystal panels corresponding to various optical paths (R, G and B). The aforesaid liquid crystal panels, due to consideration regarding the size of the pixel structure, mostly deploy the liquid crystal on silicon (LCOS) technology, which belongs to a kind of micro-display.

LCOS is a liquid crystal panel that builds on a silicon wafer back panel. Because the LCOS liquid crystal panel that utilizes a silicon wafer as a back panel uses metal-oxide-semiconductor (MOS) transistors instead of the conventional thin film transistors, the pixel electrodes are fabricated using metallic material. Hence, the LCOS belongs to a reflective type of liquid crystal panel. Because the metallic pixel electrode of LCOS completely covers a pixel region, especially, completely covers the MOS transistors, the image display capacity of the LCOS panel is much better than a conventional liquid crystal display. Moreover, with the LCOS build on a silicon back panel, the LCOS occupies a small volume and has a high resolution. Therefore, it is quite common to see the application of LCOS technology inside a liquid crystal projector. Furthermore, the LCOS technology also matches the demand for producing less bulky liquid crystal projectors.

For a micro-display, a higher the aperture ratio usually implies a better light reflection capacity and a higher display performance. However, most micro-display devices using LCOS as the liquid crystal panel has a moderate aperture ratio and device performance due to the limitations in the photolithographic process. Thus, increasing the aperture ratio and improving device performance have become the two most important directions in the future development of micro-display devices.

SUMMARY OF THE INVENTION

Accordingly, at least one objective of the present invention is to provide a process for fabricating a micro-display capable of increasing the aperture ratio and the reflectivity of light of the micro-display.

At least another objective of the present invention is to provide a micro-display with a higher aperture ratio and a higher reflectivity of light.

To achieve these and other advantages and in accordance with the purpose of the invention, as embodied and broadly described herein, the invention provides a process for fabricating a micro-display. First, a wafer having a driving circuit thereon is provided. Then, a metallic reflective layer is formed on the wafer. Thereafter, an anti-reflection layer and a patterned photoresist layer are sequentially formed on the metallic reflective layer. Using the patterned photoresist layer as an etching mask, the anti-reflection layer and the metallic reflective layer are etched to form a trench pattern that exposes the surface of the wafer. After that, the patterned photoresist layer is removed. A dielectric layer is formed to cover the anti-reflection layer and fill the trench pattern. Then, a portion of the dielectric layer and the anti-reflection layer are removed to expose the surface of the metallic reflective layer.

According to the embodiment of the present invention, the patterned photoresist layer is fabricated using deep ultraviolet photoresist, for example.

According to the embodiment of the present invention, the aforesaid step of forming the trench pattern includes directly removing a portion of the anti-reflection layer and a portion of the metallic reflective layer using the patterned photoresist layer as an etching mask until the surface of the wafer is exposed. In another embodiment, the step for forming the trench pattern includes removing a portion of the anti-reflection layer until the surface of the metallic reflective layer is exposed. Then, the patterned photoresist layer is removed. After that, using the anti-reflection layer as an etching mask, a portion of the metallic reflective layer is removed until the surface of the wafer is exposed.

According to the embodiment of the present invention, the metallic reflective layer is fabricated using aluminum, gold or silver, for example.

According to the embodiment of the present invention, the anti-reflection layer is an inorganic anti-reflection layer, for example.

According to the embodiment of the present invention, the dielectric layer is an oxide layer, for example.

According to the embodiment of the present invention, the step of removing a portion of the dielectric layer and the anti-reflection layer to expose the surface of the metallic reflective layer includes performing a chemical-mechanical polishing operation, for example.

According to the embodiment of the present invention, the trench pattern has a chessboard configuration.

The present invention also provides an alternative process for fabricating a micro-display. First, a wafer having a driving circuit thereon is provided. Then, a metallic reflective layer is formed on the wafer. Thereafter, a first dielectric layer, an anti-reflection layer and a patterned photoresist layer are sequentially formed on the metallic reflective layer. Using the patterned photoresist layer as an etching mask, the anti-reflection layer, the first dielectric layer and the metallic reflective layer are etched to form a trench pattern that exposes the surface of the wafer. After that, the patterned photoresist layer is removed. A second dielectric layer is formed to cover the anti-reflection layer and fill the trench pattern. Then, a portion of the second dielectric layer, the anti-reflection layer and the first dielectric layer are removed to expose the surface of the metallic reflective layer.

According to the embodiment of the present invention, the patterned photoresist layer is fabricated using deep ultraviolet photoresist, for example.

According to the embodiment of the present invention, the aforesaid step of forming the trench pattern includes directly removing a portion of the anti-reflection layer, a portion of the first dielectric layer and a portion of the metallic reflective layer using the patterned photoresist layer as an etching mask until the surface of the wafer is exposed. In another embodiment, the step for forming the trench pattern includes removing a portion of the anti-reflection layer and the first dielectric layer until the surface of the metallic reflective layer is exposed. Then, the patterned photoresist layer is removed. After that, using the anti-reflection layer and the first dielectric layer as an etching mask, a portion of the metallic reflective layer is removed until the surface of the wafer is exposed.

According to the embodiment of the present invention, the metallic reflective layer is fabricated using aluminum, gold or silver, for example.

According to the embodiment of the present invention, the anti-reflection layer is an inorganic anti-reflection layer, for example.

According to the embodiment of the present invention, the first dielectric layer is an oxide layer, for example.

According to the embodiment of the present invention, the second dielectric layer is an oxide layer, for example.

According to the embodiment of the present invention, the step of removing a portion of the second dielectric layer, the anti-reflection layer and the first dielectric layer to expose the surface of the metallic reflective layer includes performing a chemical-mechanical polishing operation, for example.

According to the embodiment of the present invention, the trench pattern has a chessboard configuration.

In the present invention, a trench pattern having a small dimension is defined through an anti-reflection layer or a dielectric layer and an anti-reflection layer formed over a metallic reflective layer. In other words, there is a breakthrough in the photolithographic process to produce a micro-display with a higher aperture ratio. Hence, there is an increase in the reflectivity of light and performance of the device. Moreover, the anti-reflection layer or the combination of the dielectric layer and anti-reflection layer formed on the metallic reflective layer can further reduce the dimension of gaps in the etching mask.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
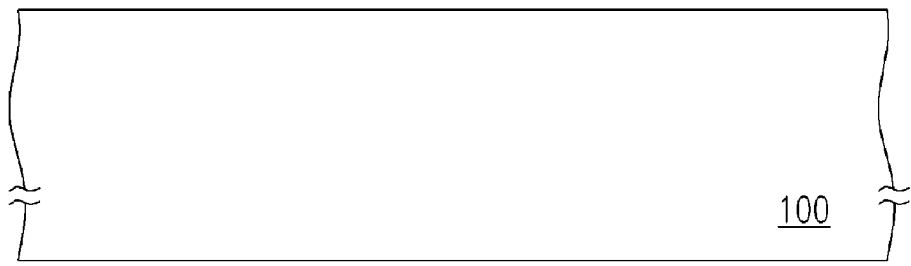
FIGS. 1A through 1F are schematic cross-sectional views showing the steps for fabricating a micro-display according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIGS. 1A through 1F are schematic cross-sectional views showing the processes for fabricating a micro-display according to one embodiment of the present invention. First, as shown in FIG. 1A, a wafer 100 having a driving circuit thereon (shown in FIG. 2) is provided. The wafer 100 is a silicon wafer, for example. The driving circuit shown in FIG. 2 is a circuit fabricated, for example, using a standard complementary metal-oxide-semiconductor (CMOS) technique. The driving circuit comprises a transistor 200, a capacitor 202 and an interconnect structure 204. Since the technique and material for forming the driving circuit should be familiar to persons engaged in this field, a detailed description is omitted. Furthermore, a detailed outline of the various structural components in FIG. 2 is omitted in all subsequent drawings.

Figure 1B:
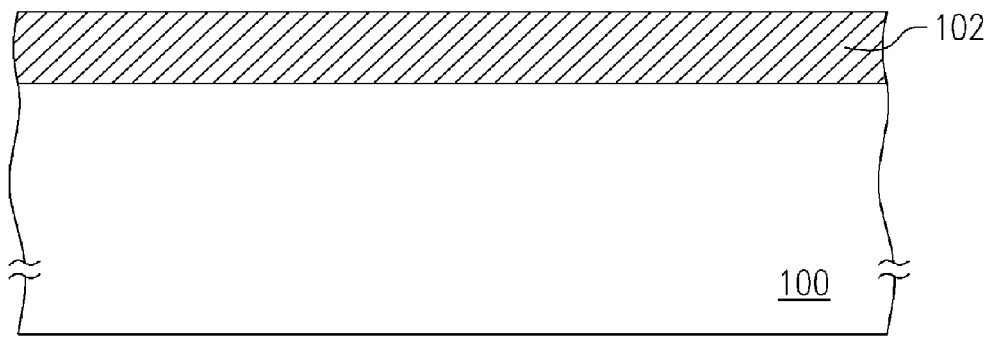
Figure 2:
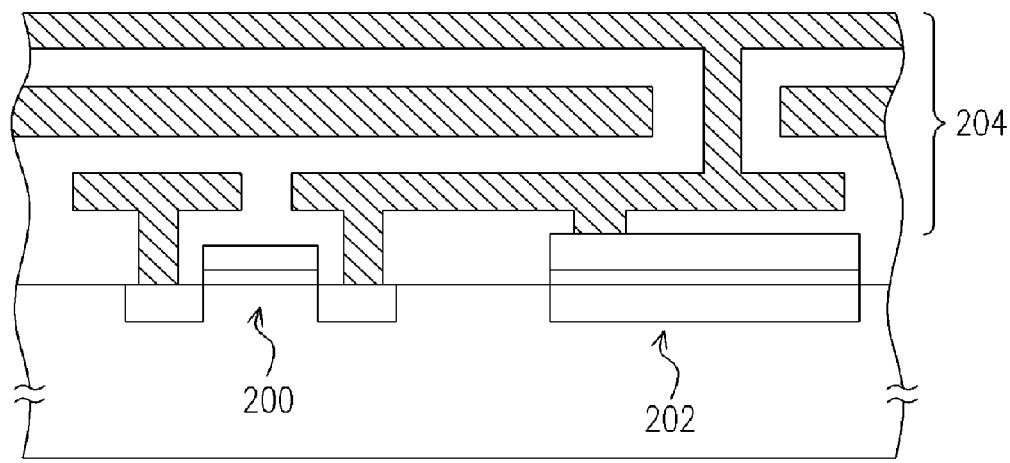
FIG. 2 is a schematic cross-sectional view of the driving circuit of a micro-display according to present invention.

As shown in FIG. 1B, a metallic reflective layer 102 is formed on the wafer 100. The metallic reflective layer 102 is formed, for example, by performing a chemical vapor deposition process. The metallic reflective layer 102 is fabricated using aluminum, gold, silver or other suitable metallic reflective material, for example. The metallic reflective layer 102 serves as a mirror layer in the micro-display. In other words, a beam of light incident upon the display will be reflected back on encountering the metallic reflective layer 102.

Figure 1C:
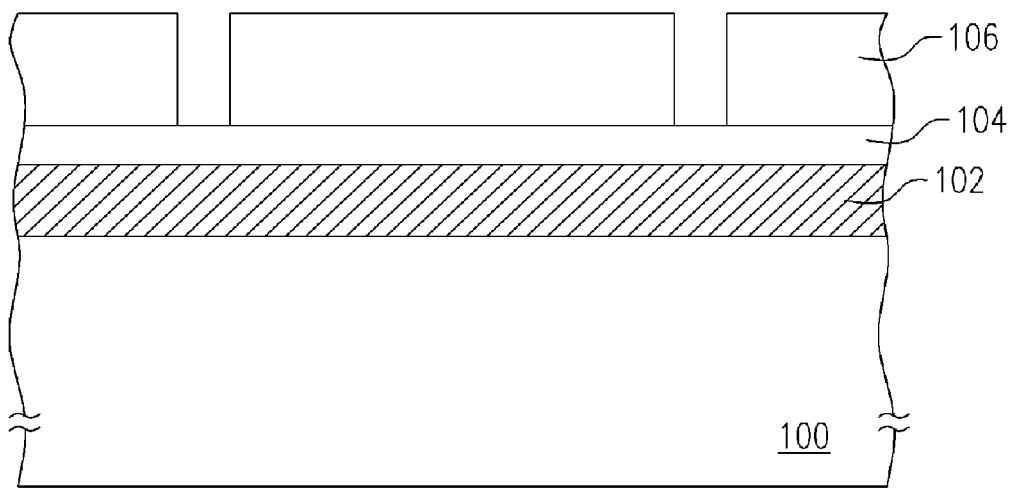

As shown in FIG. 1C, an anti-reflection layer 104 and a patterned photoresist layer 106 are sequentially formed over the metallic reflective layer 102. The patterned photoresist layer 106 is fabricated using deep ultra-violet (DUV) photoresist, for example. The anti-reflection layer 104 is an inorganic anti-reflection layer, for example. The inorganic anti-reflection layer is formed, for example, by performing a chemical vapor deposition process using material such as non-crystalline phase carbon, silicon nitride, silicon oxy-nitride or titanium oxide.

Figure 1D:
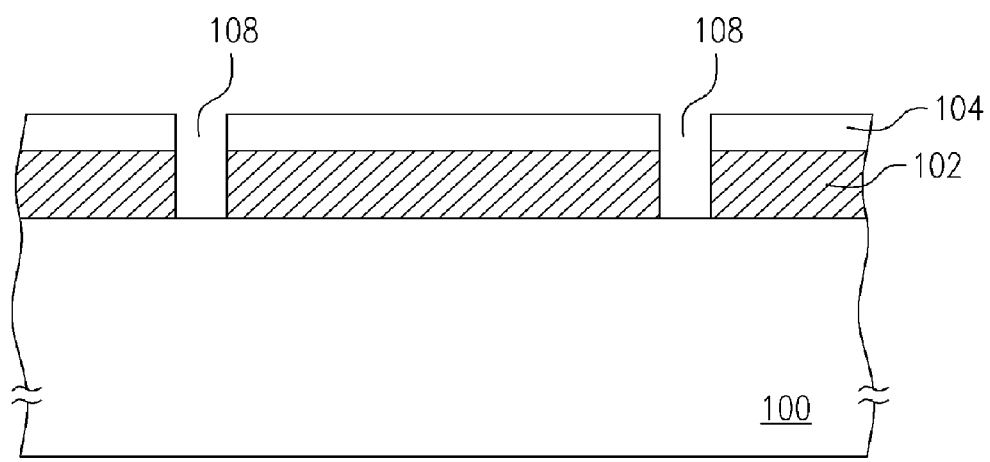
Figure 3:
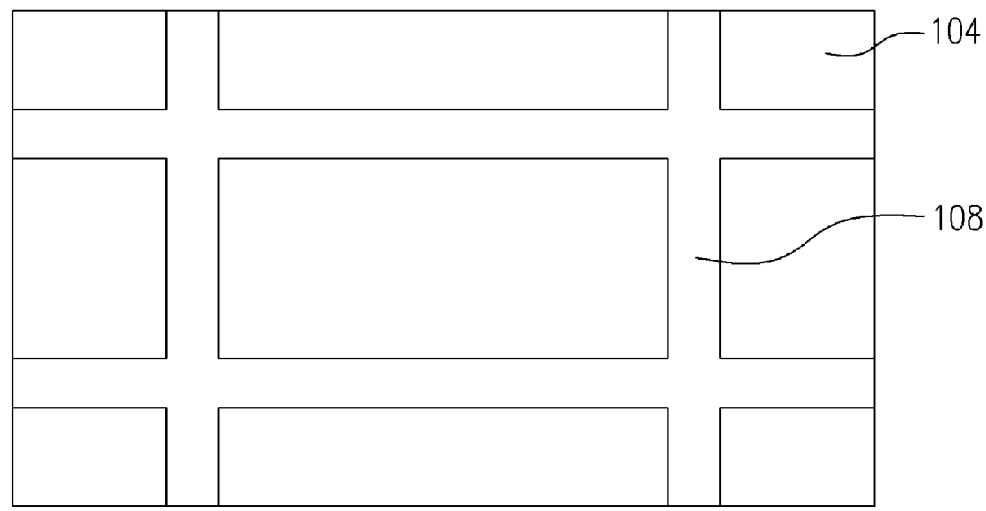
FIG. 3 is a schematic cross-sectional view of the mirror layer of a micro-display according to the present invention.

As shown in FIG. 1D, using the patterned photoresist layer 106 as an etching mask, a trench pattern 108 that exposes the surface of the wafer 100 is formed in the anti-reflection layer 104 and the metallic reflective layer 102. Thereafter, the photoresist layer 106 is removed. The trench pattern 108 has a chessboard configuration (as shown in FIG. 3) so that the metallic reflective layer 102 is divided into a plurality of smallish areas for producing a plurality of micro-displays. Obviously, the trench pattern 108 in the present invention is not limited to a chessboard configuration. In fact, other shapes should be produced to match the actual processing requirements or design needs.

The method of forming the trench pattern 108, for example, includes directly removing a portion of the anti-reflection layer 104 and a portion of the metallic reflective layer 102 using the patterned photoresist layer 106 as an etching mask until the surface of the wafer 100 is exposed. The method of removing a portion of the anti-reflection layer 104 and the metallic reflective layer 102, for example, includes performing an anisotropic etching process, for example.

In another embodiment, the method of forming the trench pattern 108, for example, includes removing a portion of the anti-reflection layer 104 using the patterned photoresist layer 106 as an etching mask until the surface of the metallic reflective layer 102 is exposed. Then, the photoresist layer 106 is removed. Thereafter, using the anti-reflection layer 104 as an etching mask, a portion of the metallic reflective layer 102 is removed until the surface of the wafer 100 is exposed. Thus, the trench pattern 108 is formed in the anti-reflection layer 104 and the metallic reflective layer 102.

Figure 1E:
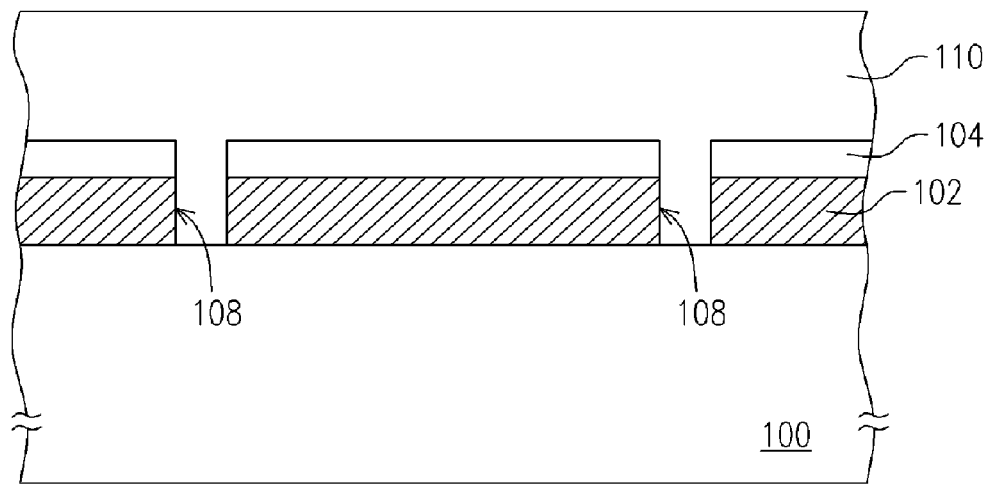

As shown in FIG. 1E, a dielectric layer 110 is formed over the substrate 100 to cover the anti-reflection layer 104 and fill the trench pattern 108. The dielectric layer 110 is formed, for example, by performing a chemical vapor deposition process. The dielectric layer 110 can be an oxide layer fabricated using silicon oxide, for example.

Figure 1F:
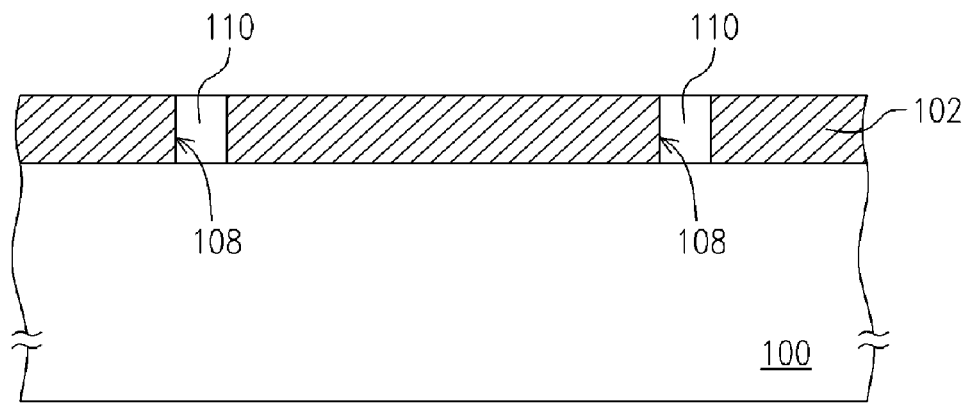

As shown in FIG. 1F, a portion of the dielectric layer 110 and the anti-reflection layer 104 are removed until the surface of the metallic reflective layer 102 is exposed. The method of removing a portion of the dielectric layer 110 and the anti-reflection layer 104 includes performing a chemical-mechanical polishing process, for example.

After the aforesaid processes, the fabrication of various elements including a liquid crystal layer, an indium-tin-oxide (ITO) layer and a glass substrate can be carried out to form a complete micro-display. Since the processes and related parameters for fabricating the liquid crystal layer, ITO layer or the glass substrate should be familiar to those skilled in this field, a detail description is omitted.

In the present invention, an anti-reflection layer is formed on the metallic reflective layer to provide a breakthrough in the photolithographic process. Hence, a trench pattern with smaller gaps can be defined. As a result, the aperture ratio of the micro-display is increased so that both the reflectivity of light and the performance of the device are improved.

In the following, another embodiment is provided to illustrate the process in the present invention. FIGS. 4A through 4F are schematic cross-sectional views showing the steps for fabricating a micro-display according to another embodiment of the present invention. In FIGS. 4A through 4F, some of the elements are identical to the ones in FIGS. 1A through 1F and hence labeled identically. Since these elements have been described before, a description of such elements is not repeated here.

Figure 4A:
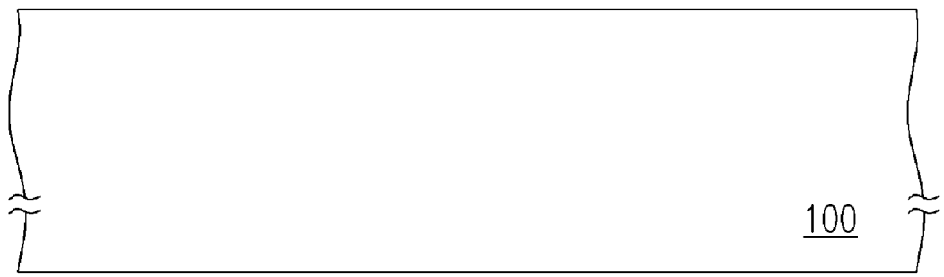
FIGS. 4A through 4F are schematic cross-sectional views showing the steps for fabricating a micro-display according to another embodiment of the present invention.

First, as shown in FIG. 4A, a wafer 100 having a driving circuit thereon is provided.

Figure 4B:
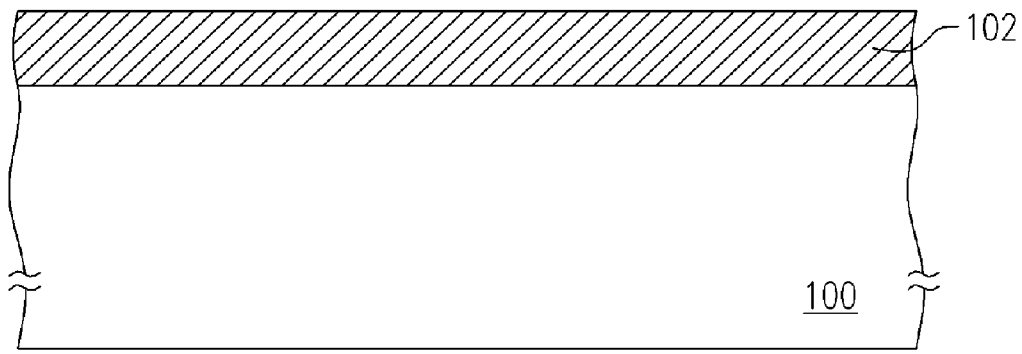

As shown in FIG. 4B, a metallic reflective layer 102 is formed on the wafer 100.

Figure 4C:
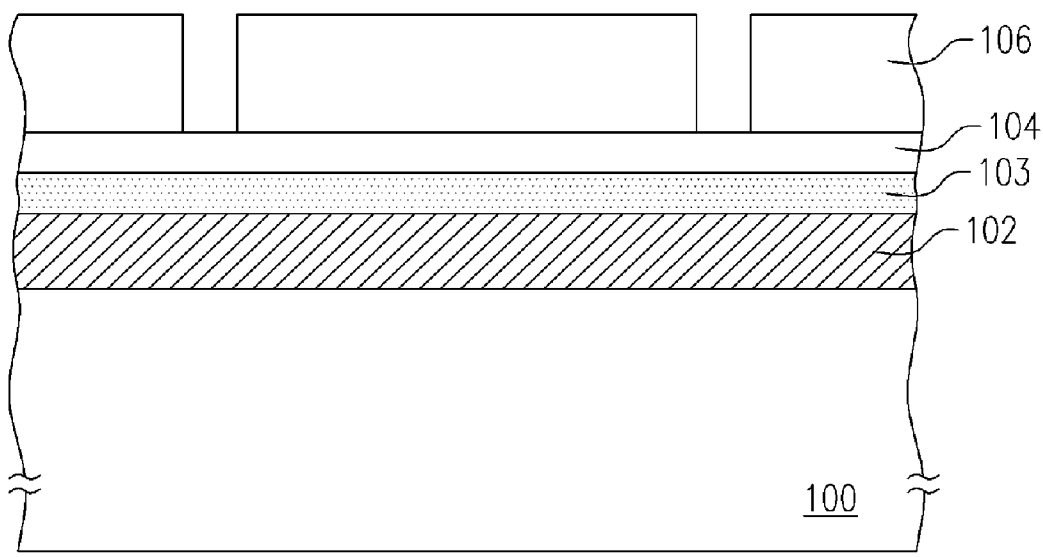

As shown in FIG. 4C, a dielectric layer 103, an anti-reflection layer 104 and a patterned photoresist layer 106 are sequentially formed over the metallic reflective layer 102. The dielectric layer 103 is an oxide layer formed, for example, by performing a chemical vapor deposition process using tetra-ethyl-ortho-silicate (TEOS) as a source of the reactive gas.

Figure 4D:
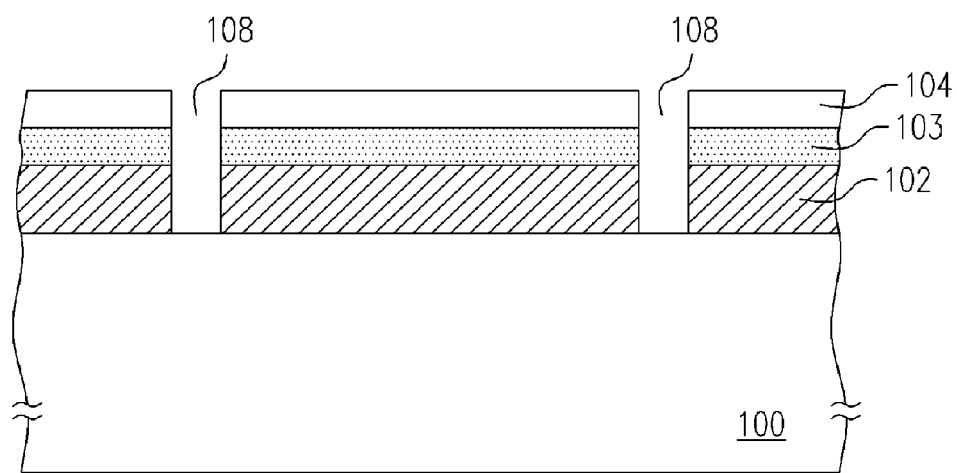

As shown in FIG. 4D, using the photoresist layer 106 as an etching mask, a trench pattern 108 is formed in the anti-reflection layer 104, the dielectric layer 106 and the metallic reflective layer 102 to expose the surface of the wafer 100. Then, the patterned photoresist layer 106 is removed. The method of forming the trench pattern 108 includes directly removing a portion of the anti-reflection layer 104, the dielectric layer 103 and a portion of the metallic reflective layer 102 using the patterned photoresist layer 106 as an etching mask until the surface of the wafer 100 is exposed.

In another embodiment, the method of forming the patterned trench 108, for example, includes removing a portion of the anti-reflection layer 104 and the dielectric layer 103 using the patterned photoresist layer 106 as an etching mask until the surface of the metallic reflective layer 102 is exposed. Then, the patterned photoresist layer 106 is removed. Thereafter, using the anti-reflection layer 104 and the dielectric layer 103 as an etching mask, a portion of the metallic reflective layer 102 is removed until the surface of the wafer 100 is exposed.

Figure 4E:
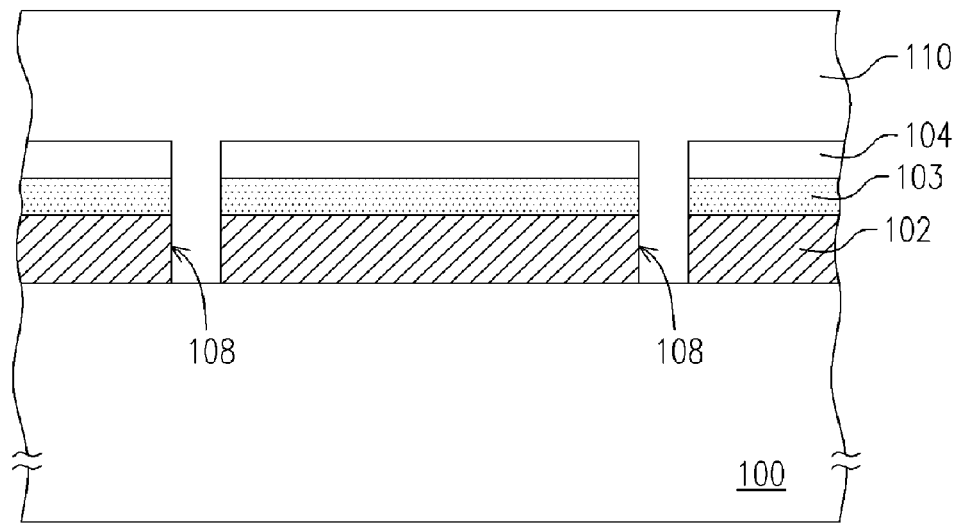

As shown in FIG. 4E, a dielectric layer 110 is formed over the substrate 100 to cover the anti-reflection layer 104 and fill the patterned trench 108.

Figure 4F:
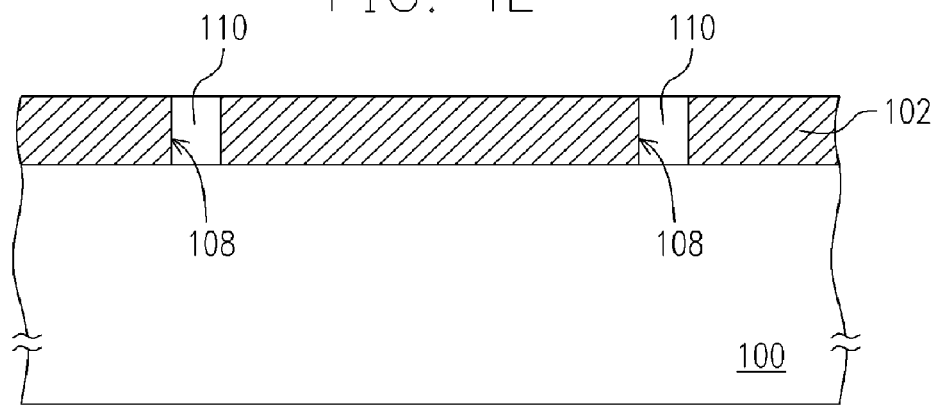

As shown in FIG. 4F, a portion of the dielectric layer 110, the anti-reflection layer 104 and the dielectric layer 103 are removed until the surface of the metallic reflective layer 102 is exposed.

Similarly, after the aforesaid processes, the fabrication of various elements including a liquid crystal layer, an indium-tin-oxide (ITO) layer and a glass substrate can be carried out to form a complete micro-display.

In the aforementioned embodiment of the present invention, a dielectric layer 103 and an anti-reflection layer 104 are formed on the metallic reflective layer 102 to provide a breakthrough in the photolithographic process. Hence, a trench pattern with smaller gaps can be defined. As a result, the aperture ratio of the micro-display is increased so that both the reflectivity of light and the performance of the device are improved. In addition, the dielectric layer 103 can prevent possible damage to the surface of the metallic reflective layer 102 in a subsequent process.

In summary, the process of fabricating a micro-display according to the present invention is able to provide a breakthrough in the photolithographic process by forming an anti-reflection layer or a combination of a dielectric layer and an anti-reflection layer on a metallic reflective layer. With the reduction of gap dimensions, the aperture ratio of the micro-display is increased and both the reflectivity of light and the performance of the device are improved. On the other hand, the anti-reflection layer or the combination of the dielectric layer and the anti-reflection layer formed on the metallic reflective layer can serve as an etching mask for further reducing the gap dimension.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A process for fabricating a micro-display, comprising:
   providing a wafer, wherein the wafer has a driving circuit formed thereon;
   forming a metallic reflective layer on the wafer;
   forming an anti-reflection layer and a patterned photoresist layer in sequence over the metallic reflective layer;
   forming a trench pattern in the anti-reflection layer and the metallic reflective layer using the patterned photoresist layer as an etching mask to expose the surface of the wafer;
   removing the patterned photoresist layer;
   forming a dielectric layer to cover the anti-reflection layer and fill the trench pattern; and
   removing the dielectric layer and the anti-reflection layer above a top surface of the metallic reflective layer until the surface of the metallic reflective layer is exposed, so that a remained dielectric layer and the metallic reflective layer with the trench pattern are remained to form a part of the micro-display.

2. The process of claim 1, wherein the material constituting the patterned photoresist layer comprises deep ultra-violet photoresist.

3. The process of claim 1, wherein the method for forming the trench pattern comprises directly removing a portion of the anti-reflection layer and a portion of the metallic reflective layer using the patterned photoresist layer as an etching mask until the surface of the wafer is exposed.

4. The process of claim 1, wherein the method of forming the trench pattern comprises:
   removing a portion of the anti-reflection layer using the patterned photoresist layer as an etching mask until the surface of the metallic reflective layer is exposed;
   removing the patterned photoresist layer; and
   removing a portion of the metallic reflective layer using the anti-reflection layer as an etching mask until the surface of the wafer is exposed.

5. The process of claim 1, wherein the material constituting the metallic reflective layer comprises aluminum, gold or silver.

6. The process of claim 1, wherein the anti-reflection layer comprises an inorganic anti-reflection layer.

7. The process of claim 1, wherein the dielectric layer comprises an oxide layer.

8. The process of claim 1, wherein the method of removing a portion of the dielectric layer and the anti-reflection layer until the surface of the metallic reflective layer is exposed comprises performing a chemical-mechanical polishing operation.

9. The process of claim 1, wherein the trench pattern has a chessboard configuration.

10. The process of claim 1, wherein a area of the metallic reflective layer with the trench pattern is larger than that of the remained dielectric layer.

11. A process for fabricating a micro-display, comprising:
providing a wafer, wherein the wafer has a driving circuit formed thereon;
forming a metallic reflective layer on the wafer;
forming a first dielectric layer, an anti-reflection layer and a patterned photoresist layer in sequence over the metallic reflective layer;
forming a trench pattern in the anti-reflection layer, the first dielectric layer and the metallic reflective layer using the patterned photoresist layer as an etching mask to expose the surface of the wafer;
removing the patterned photoresist layer;
forming a second dielectric layer to cover the anti-reflection layer and fill the trench pattern; and
removing the second dielectric layer, the anti-reflection layer and the first dielectric layer above a top surface of the metallic reflective layer until the surface of the metallic reflective layer is exposed, so that a remained second dielectric layer and the metallic reflective layer with the trench pattern are remained to form a part of the micro-display.

12. The process of claim 11, wherein the material constituting the patterned photoresist layer comprises deep ultra-violet photoresist.

13. The process of claim 11, wherein the method for forming the trench pattern includes directly removing a portion of the anti-reflection layer, a portion of the first dielectric layer and a portion of the metallic reflective layer using the patterned photoresist layer as an etching mask until the surface of the wafer is exposed.

14. The process of claim 11, wherein the method of forming the trench pattern comprises:
removing a portion of the anti-reflection layer and the first dielectric layer using the patterned photoresist layer as an etching mask until the surface of the metallic reflective layer is exposed;
removing the patterned photoresist layer; and
removing a portion of the metallic reflective layer using the anti-reflection layer and the first dielectric layer as an etching mask until the surface of the wafer is exposed.

15. The process of claim 11, wherein the material constituting the metallic reflective layer comprises aluminum, gold or silver.

16. The process of claim 11, wherein the anti-reflection layer comprises an inorganic anti-reflection layer.

17. The process of claim 11, wherein the first dielectric layer comprises an oxide layer.

18. The process of claim 11, wherein the second dielectric layer comprises an oxide layer.

19. The process of claim 11, wherein the method of removing a portion of the second dielectric layer, the anti-reflection layer and the first dielectric layer until the surface of the metallic reflective layer is exposed comprises performing a chemical-mechanical polishing operation.

20. The process of claim 11, wherein the trench pattern has a chessboard configuration.

21. The process of claim 11, wherein a area of the metallic reflective layer with the trench pattern is larger than that of the remained dielectric layer.

* * * * *